United States Patent [19]

Lew et al.

[11] Patent Number: 5,132,125

[45] Date of Patent: * Jul. 21, 1992

[54] ENCAPSULATED CORN KERNELS AND METHOD OF FORMING THE SAME

[75] Inventors: Chel W. Lew; Darren E. Barlow, both of San Antonio, Tex.

[73] Assignee: Southwest Research Institute, San Antonio, Tex.

[*] Notice: The portion of the term of this patent subsequent to Nov. 14, 2006 has been disclaimed.

[21] Appl. No.: 675,552

[22] Filed: Mar. 25, 1991

Related U.S. Application Data

[63] Continuation-in-part of Ser. No. 422,695, Oct. 17, 1989, Pat. No. 5,002,785, which is a continuation-in-part of Ser. No. 277,296, Nov. 29, 1988, Pat. No. 4,880,646.

[51] Int. Cl.$^5$ .............. A23L 1/10; A23L 1/18; A23L 1/212; A23P 1/08
[52] U.S. Cl. .................. 426/93; 426/102; 426/113; 426/303; 426/307; 426/309
[58] Field of Search .............. 426/93, 113, 303, 307, 426/309, 102

[56] References Cited

U.S. PATENT DOCUMENTS

| | | | |
|---|---|---|---|
| 4,562,663 | 1/1986 | Redenbaugh et al. | 47/58 |
| 4,571,337 | 2/1986 | Cage et al. | 426/107 |
| 4,715,143 | 12/1987 | Redenbaugh | 47/57.6 |
| 4,767,635 | 8/1988 | Merritt et al. | 426/272 |
| 4,880,646 | 11/1989 | Lew et al. | 426/303 X |

Primary Examiner—Arthur L. Corbin

[57] ABSTRACT

Encapsulated corn kernels consisting essentially of kernels of corn suitable for popping coated over at least a portion of the outer surface thereof with an edible oleaginous substance or edible wax and thereover with an outer shell comprising an edible polymeric material and an anti-fragility and palatability enhancer; the process of making such encapsulated kernel; and microwaveable pop corn products consisting essentially of the encapsulated corn kernels in a microwaveable package.

14 Claims, No Drawings

ENCAPSULATED CORN KERNELS AND METHOD OF FORMING THE SAME

BACKGROUND OF INVENTION

1. Reference to Related Applications

The following application is a continuation-in-part of U.S. patent application Ser. No. 422,695 filed Oct. 17, 1989, now U.S. Pat. No. 5,002,785 which is in turn is a continuation-in-part of U.S. patent application Ser. No. 277,296 filed Nov. 29, 1988, now U.S. Pat. No. 4,880,646.

2. Background of Invention

The parent applications disclose and claim encapsulated popping corn kernels and other encapsulated food products and the method of forming the same. Such process comprises, in the case of corn, coating at least a portion of the outer surface of kernels of corn with an edible oleaginous substance or edible was and applying thereover an outer shell of an edible polymer. In the case of other food products they can be treated as the corn if they are to be subsequently microwaved. The disclosure of such applications are incorporated herein by reference in their entireties.

The outer coating in the case of corn is one which will retain its integrity until such time as sufficient heat is applied to pop the corn kernel.

While the procedures disclosed in the parent applications are very satisfactory it is still desired to improve the encapsulated corn products to minimize any possibility of capsule fragility, failure to properly coat the corn with the necessary edible oleoginous substance to ensure complete popping, and prevent drying of the encapsulated corn kernels.

SUMMARY OF THE INVENTION

The present invention provides novel encapsulated corn kernels which overcome the problems of the prior art and also a method of making the same which is economic.

Briefly stated, the present invention comprises encapsulated kernels of corn consisting essentially of kernels of corn suitable for popping coated over at least a portion of the outer surface thereof with an edible oleaginous substance or wax and thereover an external shell comprising an edible polymeric material and an anti-fragility and palatability enhancer in an amount sufficient to provide flexibility and elasticity to said external shell.

The invention also comprises a novel microwaveable corn product and the method of making such encapsulated corn as set forth below.

DETAILED DESCRIPTION

In the present invention any corn suitable for making popcorn can be used. As is known, not all corn is not suitable for popping, and unsuitable varieties will only crack and parch when heated instead of popping. Some suitable varieties are Pod, Flint, and Dent, but any variety of corn used for making popcorn can be utilized.

The initial step in making the encapsulated kernels is to coat the popcorn kernels, preferably the entire outer surface with an edible oleaginous substance or wax. Such coating is also preferably of a substantially uniform thickness. It is preferred to use a material which has a melting point about 100° F. and above. Examples of suitable oleaginous materials are low melting points fats partially hydrogenated oils, combinations thereof and the like, and as to the waxes, mineral waxes such as paraffins, or natural waxes such as beeswax or the edible vegetable waxes such as carnauba and the like, and synthetic waxes such as polyethylene waxes. Of these the edible fats are preferred. This coating can be accomplished by simply adding the kernels to the liquified oleaginous and/or waxy substance and then removing them from such fluid and permitting the coating to harden and dry at a lower temperature. The thus coated popcorn kernels are then coated with the outer shell forming material.

In order to ensure a more and complete coverage of the corn kernels and promote adhesion of the oleaginous substance or wax to the kernels it is preferred to add an edible oil-soluble surfactant to the same. Preferred are the SPANS such as SPAN 60, although any conventional edible oil-soluble surfactant used in foods can be utilized. Minor amounts of the surfactant can be utilized, e.g. about 0.01 to 0.1 wt. % based on the weight of the oleaginous substance or wax. While larger proportions can be utilized, it is not desirable to do so since the surfactant may adversely affect the flavor of the encapsulated corn kernels.

The outer shell forming capsular material comprises an edible polymeric material and an anti-fragility and palatability enhancer.

The polymeric material can be any edible polymeric material; either synthetic or naturally occurring polymers, such as a polyvinyl alcohol, gelatin, methyl cellulose, hydroxypropyl methylcellulose, polyethylene glycol, or an algin, and the like. Preferred are the algins.

In the case of certain materials, such as the algins, it is necessary to incorporate a material capable of hardening the same. With algins a catalytic material capable of hardening the algins is used, examples being the calcium salts such as calcium acetate, calcium chloride, calcium hydroxide, calcium gluconate, calcium lactate and other edible multivalent cationic compounds which will cause the algin to gell or solidify.

As to the anti-fragility and palatability enhancer it can be any edible plasticizer for the edible polymeric material. Examples are glycerine, sorbitol, corn syrup solids, sugars such as maltose and fructose, edible glycols, dextrins, mixtures thereof, and any other material than can plasticize (make more flexible or elastic) the polymer when it is in the form of a shell about the corn kernels.

The enhancer that is most suitable for any given polymeric material can be readily determined by routine experimentation as can the proportion of enhancer needed to give the optimum flexibility and palatability effects. Ordinarily, about 1 to 20 wt. % of the enhancer, based on the weight of the polymeric material can be utilized. While higher proportions of the enhancer can be utilized care must be taken to avoid proportions which result in a sticky shell coating or one that does not dry or which can adversely affect the desired moisture content of the encapsulated corn resulting in poor popping characteristics.

The enhancer acts to make the final shell wall more elastic and flexible thus avoiding fragility and consequent fracturing of the shell wall during processing and storage. Such fracturing can cause the kernels to be exposed to the ambient environment and lose moisture content thereby resulting in poor popping properties. Prevention of the loss of moisture also greatly increases the shelf life of the encapsulated kernels. Lastly, by making the outer shell more flexible, the palatability of the encapsulateed product is improved since there are a minimum of "hard" shell particles; i.e., rigid pieces of fractured shell particles, in the final popped product which can lower the palatability of the popped corn.

It is also preferred to include a surfactant with the encapsulating material to ensure a more uniform and complete coating of the kernels. In this instance any edible water-soluble type surfactant used in foods and compatible with the particular polymer used can be utilized. Examples of suitable surfactants are the TWEENS, such as TWEEN 80. As in the case of the oil-soluble surfactants utilized with the oleaginous substance or wax, care must be taken not to add an amount of the water-soluble surfactant which will have a detrimental affect on the flavor of the encapsulated corn kernels.

Amounts of water-soluble surfactant ranging from about 0.01 to 0.1 wt. % based on the weight of encapsulating material solids can be satisfactorily utilized.

After the desired thickness of the capsule layer has been attained, the encapsulated corn kernels are simply removed from the solution, as by screening, rinsed, and dried. The thus encapsulated popcorn kernels can then be packaged and used in any conventional packaging material such as paper or paperboard; they do not need the special packaging of the present microwaveable popping corn. In addition they are not limited in that they can also be popped in conventional heating ovens or over open heat without any packaging.

Equally importantly, by thus encapsulating the kernels their initial moisture levels are maintained and there is therefore a greatly reduced incident of "unpopped" kernels when the encapsulated kernels are heated for popping after storage. Also, the oleaginous or waxy coatings generate the higher heat and shorten the time required to pop the corn.

The process of the instant invention is significant since it permits the mass production of the coated encapsulated kernels. In the instant method, if an algin is used the catalyst or hardening compound is added to the initial layer about the corn kernel followed by adding the kernels to the algin either in solution or in the form of an aqueous mist or spray. The catalyst in the inner shell then reacts with the algin in the solution or sprayed to form the outer encapsulating alginate layer about the corn. The procedure can be carried out either on a batch or on a continuous basis.

In the continuous basis the corn kernels are preferably put on a perforated conveyer belt which dips into a bath of the liquefied oleaginous substance or wax and surfactant (if used) and carries the corn therethrough to ensure coating of all of the kernels. The traveling belt then removes the coated corn from the bath and conveys it for a time sufficient to dry the same so it can then be placed into the solution of the encapsulating material containing the edible polymer and enhancer. If an alginate encapsulating layer is to be utilized, intermediate the tank containing the oleaginous substance or wax and that containing the encapsulating material, there is a zone of application of a layer the catalyst material onto the coated corn. This is preferably done in the form of a fine catalyst powder applied onto the corn having a tacky surface of oleaginous substance or wax that has not been completely dried.

The retention time of the corn in the encapsulating material is dependent upon the thickness desired of the shell and can vary widely. The thickness need only be that required to ensure that the shell does not abrade or rupture during packaging, transportation, and storage to expose the inner oleaginous or waxy layer. This will vary dependent upon the strength of the particular encapsulating material used and can be determined by routine experimentation. Use of an edible plasticizer ensures the flexibility of the shell and vastly minimizes the possibility of shell rupture. Excess thickness may result in an objectionable amount of outer shell residue in terms of causing undesirable taste.

As to the thickness of the inner oleaginous or waxy layer there is again no criticality as long as there is a coating of the kernels. However, the thickness should not be too great so as to give the popped corn an oily or waxy taste Again, routine experimentation will determine the most suitable thickness for any particular oleaginous material or wax.

If desired, the oleaginous or waxy layer can also contain flavorants, such as salt, pepper, spices, flavoring oils, or combination thereof; odorants such as volatile oils to give a butter or other aroma; biocides such as edible fungicides; i.e., sodium propionate and the like, to inhibit any mold spoilage of the corn; colorants to give different colored popcorn; as well as combinations of the foregoing and other edible materials that can be added to popcorn. In the case of oleaginous materials, conventional antioxidants can be added to inhibit or prevent rancidity. If desired, some of these components can be included in the outer shell.

The invention will be further described in connection with the following example which is set forth for purposes of illustration only.

EXAMPLE 1

Approximately 25 parts by weight of popcorn kernels are dispersed in approximately 5 parts by weight of MELVO, a low melting fat (partially hydrogenated soybean/cotton seed oil 99°–100° F. m.p.). The slurry containing the popcorn kernels is kept at approximately 105° F. and the fat-coated popcorn kernels removed from slurry onto a bed of 50 parts by weight mixture of starch and calcium acetate to form a light coating of such mixture of the fat-coated kernels. The fat coated popcorn kernels with the coating of the calcium acetate are placed into a container containing approximately 300 parts by weight of a 1.5% by weight aqueous algin (Satialgine S-20) and 0.15% by weight glycerine and agitated for approximately 2 to 3 minutes. The thus encapsulated popcorn kernels with the fat inner shell and alginate outer shell are screened from the alginate-glycerine aqueous solution, rinsed several times with tap water to remove the excess alginate solution, and air dried.

The resultant encapsulated coated corn kernels have an excellent shelf life and popping characteristics and a flexible outer shell.

EXAMPLE 2

The process of Example 1 is carried out except that 0.05% by weight of TWEEN 80, based on the weight of algin solids, is added to the algin solution. This results in a more uniform shell coating.

EXAMPLE 3

The procedure of Example 2 is followed, except at 0.05% by weight of SPAN 60, based on the weight of MELVO, is included with the MELVO.

This provides better adhesion of the MELVO to the corn kernels and ensures a sufficient oil coating for most effective popping.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. Encapsulated corn kernels consisting essentially of kernels of corn, suitable for popping coated over at least a portion of the outer surface thereof with an edible oleaginous substance or edible wax and thereover with an outer shell comprising an edible polymeric material and an edible anti-fragility and palatability enhancer in an amount sufficient to provide flexibility to said outer shell.

2. The encapsulated corn kernels of claim 1 wherein the edible oleaginous material is selected from low melting point fats, partially hydrogenated oils, or combinations thereof, said edible wax is selected from mineral waxes, natural waxes, or synthetic waxes and said edible polymeric material is selected from a polyvinyl alcohol, gelatin, methyl cellulose, hydroxypropyl cellulose, polyethylene glycol, or algin, and said enhancer is an edible plasticizer compatible with and capable of plasticizing said polymeric material.

3. The encapsulated corn kernels of claim 2 wherein the kernels are substantially entirely uniformly coated with said oleaginous or waxy material and said oleaginous or waxy material includes an edible oil-soluble surfactant.

4. The encapsulated corn kernels of claims 1, 2, or 3 wherein said polymeric material is an algin.

5. The encapsulated corn kernels of claims 1, 2, or 3 wherein said outer shell includes an edible water-soluble surfactant.

6. A microwaveable corn product consisting essentially of the encapsulated corn kernels of claims 1, 2, or 3 in a microwaveable package.

7. The produce of claim 6 wherein said package is paper or paperboard.

8. The product of claim 6 wherein said polymeric material is an algin.

9. The product of claim 6 wherein said outer shell contains an edible water-soluble surfactant.

10. The method of encapsulating corn kernels comprising first coating at least a portion of the outer surface of said kernels with an edible oleaginous substance or edible wax and subsequently completely encapsulating said coated kernels with an outer shell comprising an edible polymeric material and an edible anti-fragility and palatability enhancer.

11. The process of claim 10 wherein the edible oleaginous material is selected from low melting point fats, partially hydrogenated oils, or combinations thereof, said edible wax is selected from mineral waxes, natural waxes, or synthetic waxes, said edible polymeric material is selected from a polyvinyl alcohol, gelatin, methyl cellulose, hydroxypropyl cellulose, polyethylene glycol, or algin, and said enhancer is an edible plasticizer capable of plasticizing said polymeric material.

12. The process of claim 11 wherein the kernels are substantially entirely uniformly coated with said oleaginous or waxy material and said oleaginous or waxy material includes an edible oil-soluble surfactant.

13. The process of claims 10, 11, or 12 wherein said polymeric material is an algin.

14. The process of claims 10, 11, or 12 wherein said outer shell includes an edible water-soluble surfactant.

* * * * *